United States Patent [19]

Billings et al.

[11] 3,748,493

[45] July 24, 1973

[54] OVER AND UNDER EXCITATION PROTECTION CIRCUIT FOR ALTERNATING CURRENT POWER SYSTEMS INCLUDING IMPROVED DEMODULATOR CIRCUIT

[75] Inventors: William W. Billings; Wendell Calfee, both of Lima, Ohio

[73] Assignee: Westinghouse Electric Corporation, Pittsburgh, Pa.

[22] Filed: Dec. 14, 1971

[21] Appl. No.: 207,876

Related U.S. Application Data

[62] Division of Ser. No. 71,925, Sept. 14, 1970, Pat. No. 3,683,199.

[52] U.S. Cl. .................................. 307/232, 307/317
[51] Int. Cl. .............................................. H03k 5/20
[58] Field of Search .................... 307/232, 317, 318; 323/16

[56] References Cited
UNITED STATES PATENTS

| | | | |
|---|---|---|---|
| 3,038,089 | 6/1962 | Kittrell | 307/317 |
| 3,198,961 | 8/1965 | Millsap | 307/232 |
| 3,524,997 | 8/1970 | Harnden | 323/16 |
| 3,480,868 | 11/1969 | Modiano | 307/317 |
| 3,369,810 | 2/1968 | Day | 307/317 |
| 3,076,902 | 2/1963 | Van Duzer | 307/317 |
| 3,391,345 | 7/1968 | Burgert | 307/232 |

FOREIGN PATENTS OR APPLICATIONS

| | | | |
|---|---|---|---|
| 1,096,794 | 2/1955 | France | 307/317 |

OTHER PUBLICATIONS

Motorola "Semiconductor Power Circuits Handbook" 1968, pages 3–28 & 3–29.
Liu "Zener Diode in OP Amp" Electronics February 16, 1970, page 105.

Primary Examiner—John W. Huckert
Assistant Examiner—R. E. Hart
Attorney—A. T. Stratton, G. H. Telfer et al.

[57] ABSTRACT

Polyphase generators operating in parallel are provided with a circuit to protect against over or under excitation of any one generator. The circuit comprises means for developing a direct voltage proportional to the differential reactive current of each generator and also means for developing a direct voltage proportional to the rectified phase voltages, such voltages being summed and the result compared with a reference.

1 Claim, 1 Drawing Figure

United States Patent [19]
Billings et al.
[11] 3,748,493
[45] July 24, 1973
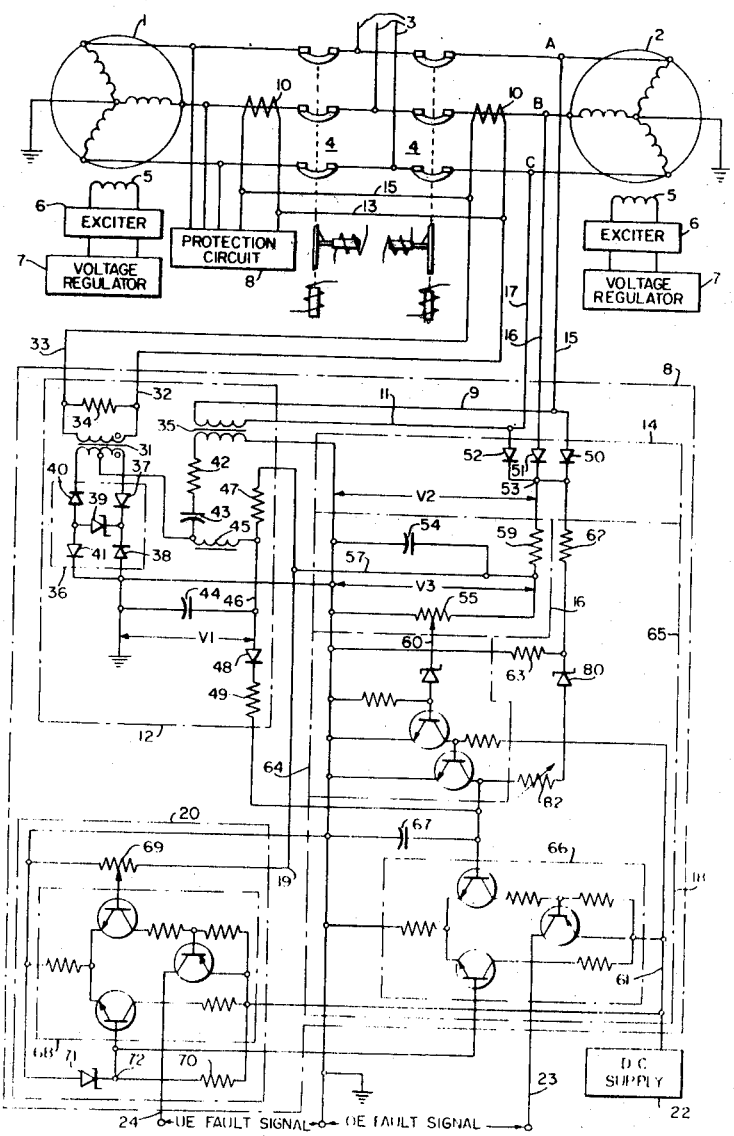

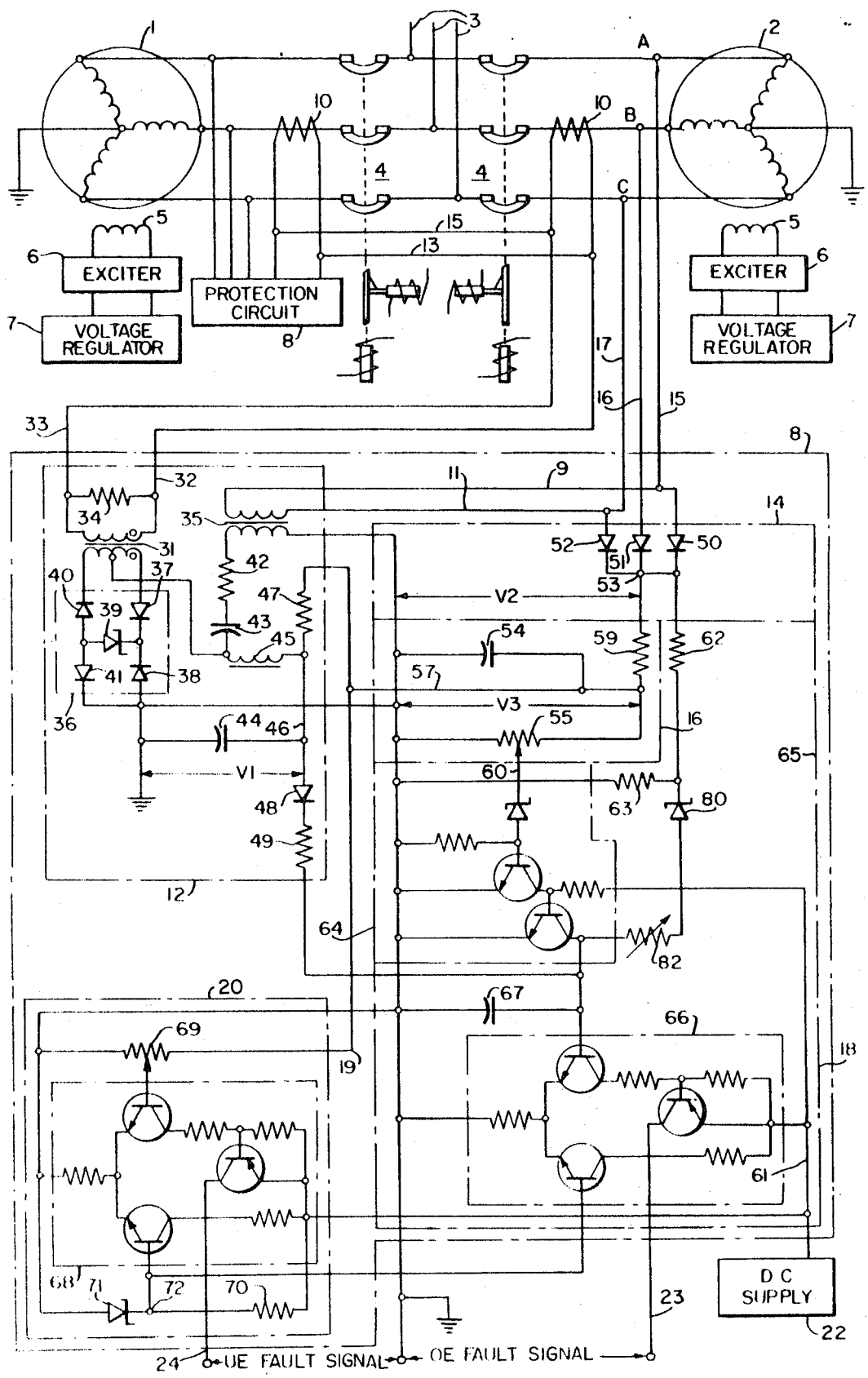

3,748,493

OVER AND UNDER EXCITATION PROTECTION CIRCUIT FOR ALTERNATING CURRENT POWER SYSTEMS INCLUDING IMPROVED DEMODULATOR CIRCUIT

RELATED APPLICATION

This application is a division of copending application Ser. No. 071,925, filed Sept. 14, 1970, now U.S. Pat. No. 3,683,199, Aug. 8, 1972.

BACKGROUND OF THE INVENTION

1. Field of the Invention

The invention relates to circuits for protection against unbalanced load conditions in alternating current power systems having a plurality of polyphase power sources operating in parallel.

2. Description of the Prior Art:

The desirability of protection against unbalanced load conditions among generators of a polyphase alternating current power system (e.g. in aircraft power systems) has been previously recognized. Maintaining proper division of real load between the generators has been satisfactorily accomplished. More difficult, however, has been maintaining a proper division of reactive load between the paralleled generators. Division of reactive load between the generators is determined by the excitation on each of the generators. If one generator becomes overexcited or underexcited it will tend to make more or less, respectively, than its equal share of the reactive load. Means are therefore required to detect over or under excitation and correct for any such condition, such as by disconnecting the offending generator from the system.

Tipton and Heins U.S. Pat. No. 3,294,976, Dec. 27, 1966, is an example of prior means for detection of unbalanced reactive loads. Such patent should be referred to for background to the present invention. Such prior art systems have satisfactorily performed but it is now recognized that there is a need for greater miniaturization of protection circuits to meet customer demands for control equipment with smaller size and weight, particularly as part of aircraft power systems. Also, the typical prior art systems use high level mixing of line voltage and reactive load current bias signals to obtain an overexcitation-underexcitation sensing voltage. Undesirably bulky and expensive compoents are required in prior art systems and heat generation is a problem that restricts miniaturization. Also, a current transformer with high voltage capability is required.

SUMMARY OF THE INVENTION

This invention provides a circuit for protection against over or under excitation of polyphase alternating current power sources that are connected in parallel. The improved permits a greater degree of versatility in application, greater degree of miniaturization and generally lower cost and better performance than former circuits intended for the same purpose.

The circuit comprises a means for developing for each of the power sources a first direct voltage proportional to the difference between the reactive current of an individual power source and the average reactive current of the parallel combination of a plurality of power sources. Such difference of reactive currents can be denominated as the differential reactive current of the particular power source or generator in question. The direct voltage developed also indicates by its polarity whether there is overexcitation (plus) or underexcitation (minus) on that particular power source. The means for developing the first direct voltage preferably includes a form of demodulator circuit in accordance with this invention that does not require matched Zener diodes.

The circuit also comprises a means for developing a second direct voltage that is proportional to the combined rectified voltages of the power sources. A sensing voltage is then developed that is proportional to the sum of the two direct voltages. Comparison of the sensing voltage with a reference is made for the purpose of determining departure from pre-established limits. An excessive variation from the reference may be employed to provide an alarm signal or open a circuit breaker to remove one of the generators from the system.

BRIEF DESCRIPTION OF THE DRAWING

The single FIGURE is a schematic diagram of one embodiment of the present invention.

DESCRIPTION OF THE PREFERRED EMBODIMENTS

Referring to the drawing, a circuit schematic of one embodiment of the present invention is shown. In this example, the invention is embodied in a three-phase alternating current system having two three-phase generators 1 and 2 connected in parallel to a load bus 3 by circuit breakers 4. The generators are shown as being identical three-phase machines and each machine has a field winding 5 supplied with direct current excitation from an exciter 6 which is controlled by a voltage regulator 7. The excitation and voltage regulation system shown is merely generally illustrative of suitable known types that may be employed. The protection circuit of the present invention is a means to protect against any irregular behavior of the voltage regulator 7.

The generators 1 and 2 have been shown as conventional three-phase generators intended to be driven at constant speed although any other desired type of alternating current power source might be used, such as a power supply utilizing a static inverter or frequency changer, for example, to provide a constant frequency alternating current output.

Each of the generators 1 and 2 has associated with it a protection circuit 8, in accordance with this invention, which is to detect and protect against over or under excitation of the individual generators. The protection circuit 8 may be the same for each generator.

A current transformer 10 is on one of the phase conductors (here phase B) of each power source 1 and 2 to indicate unequal load division. These current transformers are interconnected with additive polarity in a loop circuit by conductors 13 and 15. Under balanced conditions, when each generator is supplying its proper share of the total load, the current transformer voltages are equal, and no currents can flow to circuit portion 12 from conductors 13 and 15 by way of conductors 32 and 33. Under unbalanced conditions, however, when one generator is supplying more or less than ists share of the load, the current transformer voltages become unequal and a signal current proportional to the difference in load currents of the generators will flow in each sensing circuit. This signal current may contain both real and reactive components, or it may consist only of real current or of reactive current, depending upon the nature of the unbalance. The current transformer loop circuit therefore provides a signal current proportional to the difference in load currents of the generators.

Conductors 9 and 11 are connected to each of the other phase conductors A and C, by conductors 15 and 17, respectively, to provide additional inputs to a first portion 12 of circuit 8. Circuit portion 12 and its various input means form a means for developing for each a generator a first direct voltage $V_1$ that is proportional to the differential reactive current of that power source. By the differential reactive current is meant the diffreeence between the reactive current of one generator and the average of the reactive currents of the parallel combination of power sources. More detailed description of circuit portion 12 will be presented hereinafter. The sign of voltage $V_1$ indicates whether the power source has on it a load that has a lagging power factor ($V_1$ positive in this embodiment) or a leading power factor ($V_1$ negative). The magnitude of $V_1$ indicates the magnitude of the reactive component. If $V_1$ is zero, the load is a purely resistive load.

A second portion 14 of circuit 8 is connected by conductors 15, 16 and 17 to the phase conductors and is a means to develop a second direct voltage $V_2$ that is proportional to the voltages on the phase lines as are produced by the parallel connected power sources.

With the aid of an additional circuit portion 16, the voltages $V_1$ and $V_2$ are combined and a direct voltage $V_3$, sometimes referred herein as a sensing voltage, is developed that is proportional to the sum of $V_1$ and $V_2$.

The sensing voltage $V_3$ is supplied to an overexcitation sensing circuit portion 18 and also (by conductor 19) to an underexcitation sensing circuit portion 20. The general functions of circuit portions 18 and 20 are to compare the sensing voltage $V_3$ with chosen levels of reference voltages that are developed from a DC supply 22 and to produce fault signals on either conductor 23 or 24 when over or underexcitation, respectively, occurs. Such fault signals may be variously employed to protect the power system such as by being supplied to the coil of circuit breaker 4 to isolate a given generator 2 from the operative system.

The foregoing describes the general nature and operation of the present invention. Various specific means may be employed in its implementation. As compared with prior schemes employing the concept of vector addition, the present invention is advantageously simplified in employing means to develop voltage $V_1$ that is proportional to the differential reactive current and using that voltage in eventually developing fault signals in an over and under excitation protection system.

The following will describe in substantially more detail the specific means employed in the embodiment of FIG. 1.

Circuit portion 12 in which voltage $V_1$ is developed comprises a voltage transformer 31 to step up the voltage of the signal developed by current transformer 10 and to provide isolation in the circuit. Conductors 32 and 33 connect current transformer 10 across the primary of transformer 31 and across a burden resistor 34. Conductors 9 and 11 connect voltages of phases A and C across the primary winding of a second voltage transformer 35. A bridge type clipper demodulator circuit portion 36 is connected across the secondary of transformer 31. Demodulator 36 comprises diodes 37 and 38 connected by their cathodes to the cathode of a Zener diode 39 and diodes 40 and 41 connected by the anodes to the anode of the Zener diode 39. One side of the secondary of transformer 35 is connected through a resistor 42 and a capacitor 43 to a center tap on the secondary of transformer 31. The other side of the secondary of transformer 35 is connected to ground. By the operation of the demodulator circuit 36, when the voltage across transformer 31 is zero; the average value of the output voltage is zero. This occurs when there is no reactive load on the system. When a reactive load causes a voltage to appear across transformer 35, the alternating output from the demodulator is no longer symmetrical and has a DC value. A filter comprising a capacitor 44 and inductor 45 then provides the desired direct voltage $V_1$ on line 46. Resistor 47 connects from line 46 to circuit portion 16 and to circuit portion 20. Diode 48 and resistor 49 connect from line 46 to circuit portion 18.

An important aspect of circuit portion 12 is that the demodulator circuit portion 36 includes only a single Zener diode 39. Clipper demodulators have been previously disclosed in which each of the branches from the ends of the transformer secondary comprised a Zener diode, oppositely poled in the two branches, and in each branch a diode rectifier oppositely poled to the Zener diode in that branch. Two disadvantages result from such an arrangement that are overcome by the present invention. One is that the two Zener diodes must be closely matched to avoid errors due to shifting of the origin point. The other is that, also without careful matching, temperature variations cause drifting of the voltage $V_1$ becuase of differences in the temperature coefficients of the elements. The arrangement of FIG. 1 eliminates the problem of Zener diode matching.

An additional aspect of circuit portion 12 that can help in miniaturizing the circuit is the use of transformer 35 instead of having a relatively large resistor in each connection from the phase lines to the circuit portion 12. The transformer avoids over 3 watts of heat rejection that may be an important factor in miniaturized equipment. In some applications this may be desirable even though there is some increase in size and weight. The practice of the present invention may employ either type of embodiment.

Circuit portion 14 by which the voltage $V_2$ is developed merely requires rectifiers 50, 51 and 52, each connected in one of the conductors 15, 16 and 17 to the phase conductors, with a common connection at circuit point 53.

The summing or mixing circuit portion 16 includes a capacitor 54 and a resistor 55 in parallel connection between ground and point 56. At point 56 there come together line 57 from circuit portion 12 and line 58, that includes resistor 59, from circuit portion 14. The resulting voltage $V_3$ is therefore determined by both the line voltage level (related to $V_2$) and the generator reactive load sharing with other machines (related to $V_1$). For example a takeover of lagging power factor load (load hogging) by the generator in question results in an increase in voltage $V_3$ that can then be related to preestablished trip levels, as will be subsequently described, to protect the system.

Circuit portion 18 is for the overexcitation sensing. At point 60 it has applied to it voltage $V_3$ or a portion thereof. The rectified phase voltages are connected to ground through resistors 62 and 63. It also has applied to it on line 61 a fixed direct voltage from DC supply 22.

In its general nature overexcitation sensing circuit portion 18 comprises a time delay circuit portion 65 and a voltage sensing circuit portion 64. Within time delay circuit portion 65 is another basic building block, voltage detector circuit portion 66. This combination of elements for circuit portion 18 is described in Billings U.S. Pat. No. 3,480,834, Nov. 25, 1969 which should be referred to. The voltage detector circuit portion 66 is even more fully described in Billings U.S. Pat. No. 3,365,586, Jan. 23, 1968 which should also be referred to. Consequently, a detailed description of the elements of circuit portion 18 will not be given herein.

One of the elements of the time delay circuit 65 is a capacitor 67 connected between an input to the voltage detector circuit 66 and ground. That capacitor, which has a timing function as described in the before mentioned U.S. Pat. No. 3,480,834 is provided with a charging current developed by voltage $V_1$, diode 48 and resistor 49 of circuit portion 12, and by voltage $V_2$, resistor 62 Zener diode 80 and variable resistor 82. This charging current is proportional to the magnitude of the overexcitation condition so that the time delay provided by circuit portion 65 is inversely related to the magnitude of the overexcitation condition. Consequently, only upon the occurrence of a prescribed overexcitation is an overexcitation fault signal developed on conductor 23.

The underexcitation sensing circuit 20 principally comprises a voltage detector circuit portion 68 like that previously referred to for which reference is made to U.S. Pat. No. 3,365,586. Also circuit portion 20 comprises a resistor 69 for providing a portion of $V_3$ to an input of the voltage detector 68 by way of line 19. Dropping resistor 70 and Zener diode 71 are connected across the voltage detector circuit 68 and have their midpoint 72 connected in common to one of the inputs of each of the voltage detector circuits 66 and 68 to provide thereto reference voltage $V_R$. Also, DC supply 22 is connected to each of the voltage detector circuits 66 and 68.

Upon the occurrence of an underexcitation fault, the voltage $V_3$ decreases as a result of the negative polarity of the voltage $V_1$. The decrease in $V_3$ is sensed by the under-excitation sensing circuit voltage detector 68 which provides an underexcitation fault signal on line 24 whenever $V_3$ decreases sufficiently. In this embodiment a positive signal appears on line 24 when there is no underexcitation condition and 0 volts when an underexcitation fault occurs. A subsequet built-in time delay of the circuit can be used to prevent nuisance tripping.

The circuit of the drawing can of course be variously modified. For example, the voltage detector circuit portions 66 and 68 may each be replaced by another form of transistor amplifier circuit that gives an output signal only upon being supplied an input signal of sufficient magnitude.

Thus there has been provided an improved overexcitation-underexcitation circuit that permits a high degree of circuit miniaturization, size and weight reduction, and reduced heat rejection. Low level signal mixing is employed and the use of integrated circuits is possible. Compatibility with other system portions such as voltage regulators is readily attainable.

What we claim is:

1. A demodulator circuit comprising: a first pair of terminals for receiving an alternating voltage; a first circuit branch connected between one of said pair of terminals and a common circuit point and comprising a first pair of diodes connected in series by like polarity electrodes thereof; a second circuit branch connected between the other of said pair of terminals and said common circuit point and comprising a second pair of diodes connected in series by like polarity electrodes thereof, said electrodes being of opposite polarity to the interconnected electrodes of said first pair of diodes; a Zener diode connected from the midpoint between said first pair of diodes and the midpoint between said second pair of diodes; a transformer winding connected across said pair of terminals; said winding having a center tap to which is applied a second alternating voltage to produce from said circuit an output at said common circuit point whose average voltage is proportional to phase difference between said alternating voltages.

* * * * *